United States Patent [19]

Chung et al.

[11] Patent Number: 5,185,065
[45] Date of Patent: Feb. 9, 1993

[54] LOW TEMPERATURE CORING CATHODIC ELECTROCOATING COMPOSITION

[75] Inventors: Ding Y. Chung, Rochester Hills; Allisa Gam, Troy; Robert A. Tessmer, Mt. Clemens, all of Mich.

[73] Assignee: E. I. Du Pont de Nemours and Company, Wilmington, Del.

[21] Appl. No.: 739,298

[22] Filed: Aug. 1, 1991

[51] Int. Cl.$^5$ .............................. C25D 13/04
[52] U.S. Cl. .................. 204/181.4; 209/181.7; 524/901; 525/124; 523/404; 523/415; 523/417
[58] Field of Search .................. 204/181.7, 181.4; 524/901; 525/124; 523/404, 415, 417

[56] References Cited

U.S. PATENT DOCUMENTS

| | | | |
|---|---|---|---|
| 3,583,943 | 6/1971 | Weber et al. | 260/75 |
| 3,894,922 | 7/1975 | Bosso et al. | 204/181 |
| 3,922,253 | 11/1975 | Jerabek et al. | 260/77.5 |
| 3,935,087 | 1/1976 | Jerabek et al. | 204/181 |
| 4,101,486 | 7/1978 | Bosso et al. | 209/181.7 |
| 4,137,140 | 1/1979 | Belanger | 204/181 |
| 4,335,028 | 6/1982 | Ting et al. | 209/181.7 |
| 4,399,074 | 8/1983 | Schaefer | 260/453 |
| 4,419,294 | 12/1983 | Feldman et al. | 260/453 |
| 4,419,467 | 12/1983 | Wismer et al. | 523/414 |
| 4,468,307 | 8/1984 | Wismer et al. | 204/181 |
| 4,748,200 | 5/1988 | Nasu | 524/591 |
| 4,883,572 | 11/1989 | Rao et al. | 209/181.7 |
| 5,089,101 | 2/1992 | Hayashi et al. | 209/181.7 |
| 5,120,356 | 6/1992 | Phillips et al. | 106/14.16 |

FOREIGN PATENT DOCUMENTS 74475  3/1991  Japan .

*Primary Examiner*—John Niebling
*Assistant Examiner*—Kishor Mayrkar
*Attorney, Agent, or Firm*—Hilmar L. Fricke

[57] ABSTRACT

An electrocoating composition containing an epoxy amine adduct which is the reaction product of a polyepoxide resin and an amine, an acrylic amine resin and a blocked polyisocyanate crosslinking agent;
wherein the composition is prepared by blending a first emulsion of the epoxy amine adduct and the blocked polyisocyanate crosslinking agent with a second emulsion of the acrylic amine resin and a blocked polyisocyanate crosslinking agent; where the first and second emulsions are each individually formed by blending the adduct or resin with the blocked crosslinking agent and then adding an organic acid to form a salt which forms a stable aqueous emulsion.

14 Claims, No Drawings

LOW TEMPERATURE CORING CATHODIC ELECTROCOATING COMPOSITION

BACKGROUND OF THE INVENTION

This invention is directed is to a coating composition that is used in a cathodic electrocoating process and in particular to a coating composition of an epoxy resin and an acrylic resin that provides smooth finishes having excellent corrosion and chip resistance.

The coating of electrically conductive substrates by an electrodeposition process (also called an electrocoating process) is a well known and important industrial process. Electrodeposition of primers to automotive substrates is widely used in the automotive industry. In this process, a conductive article such as an autobody or an autopart is immersed in bath of a coating composition of an aqueous emulsion of film-forming polymer and acts as an electrode in the electrodeposition process. An electric current is passed between the article and a counter-electrode in electrical contact with the aqueous emulsion, until a desired thickness of coating is deposited on the article. In a cathodic electrocoating process, the article to be coated is the cathode and the counter-electrode is the anode.

Resin compositions used in the bath of a typical cathodic electrocoating process are also well known in the art. These resins are typically made from polyepoxide resins (epoxy resins) which have been chain extended and then an adduct is formed to include amines groups in the resin. Amine groups are usually introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrocoating bath. The thickness of the coating deposited on the article is a function of the bath characteristics, the electrical operating characteristics, the immersion time, and the like.

The coated article is removed from the bath after a certain period of time. The article is rinsed with deionized water and the coating is cured typically in an oven at sufficient temperature to produce a crosslinked coating.

Cathodic electrodepositable resin compositions, coating baths, and cathodic electrodeposition processes are disclosed in Jerabek U.S. Pat. No. 3,922,253 issued Nov. 25, 1975; Wismer et al U.S. No. 4,419,467 issued Dec. 6, 1983; Belanger U.S. No. 4,137,140 issued Jan. 30, 1979 and Wismer et al U.S. No. 4,468,307 issued Aug. 25,1984, the disclosures of which are incorporated by reference.

Important characteristics of finishes formed from electrocoating compositions after baking and curing is the smoothness of the finish and the chip and corrosion resistance of the finish. Also, the stability of the electrocoating bath is important.

The novel electrocoating composition of this invention provides a stable electrocoating bath and finishes that are smooth and chip and corrosion resistant.

SUMMARY OF THE INVENTION

An electrocoating composition containing an epoxy amine adduct which is the reaction product of a polyepoxy resin and an amine, an acrylic amine resin and a blocked polyisocyanate crosslinking agent;

wherein the composition is prepared by blending a first emulsion of the epoxy amine adduct and the blocked polyisocyanate crosslinking agent with a second emulsion of the acrylic amine resin and blocked polyisocyanate crosslinking agent; where the first and second emulsions are each individually formed by blending the adduct or resin with the blocked crosslinking agent and then adding an organic acid to form a salt which forms a stable aqueous emulsion.

DETAILED DESCRIPTION OF THE INVENTION

In general, the principal emulsion used in an electrocoating composition contains an adduct such as an epoxy amine adduct blended with a crosslinking agent and is neutralized with an acid to form a water soluble product. To obtain a low temperature curing composition, such as a composition that cures at temperatures of 120°-135° C., a blocked aliphatic or aromatic isocyanate is added. One typical blocking agent is methyl ethyl ketoxime which reacts with and blocks the isocyanate groups and then on curing deblocks and the isocyanate groups react to form a crosslinked finish.

One of the problems that has been encountered with these electrocoating compositions is rough film appearance unless large amounts of coalescing solvents are used which increases the VOC (volatile organic content) of the coating which is not desirable. The reason for the rough film appearance is insufficient flow of the epoxy resin during baking at the aforementioned temperatures. The roughness problem can become particularly serious if premature crosslinking in the electrocoating bath occurs and large epoxy molecules or gel particles are formed. To enhance the flow of the composition during baking, a relatively soft (low Tg) amine functional acrylic resin can be added to the electrocoating composition. However, a simple blending of an epoxy amine adduct and an acrylic amine resin with a blocked isocyanate crosslinking agent does not produce a smooth film upon electrodeposition and the resulting emulsion is not stable. It is believed that the acrylic amine resin accelerates the reaction between the epoxy amine adduct and the blocked isocyanate crosslinking agent and promotes premature crosslinking which induces instability in the electrocoating bath and causes rough film appearance.

It has been found that by preparing two separate emulsions and subsequently blending these emulsions a stable electrocoating compositions can be formed that give smooth films with good corrosion and chip resistance. A first emulsion is prepared of an epoxy amine adduct and an alcohol blocked isocyanate crosslinking agent which is neutralized with an acid to form the emulsion. Then, a second emulsion is prepared of an acrylic amine resin and an oxide blocked isocyanate and a crosslinking agent and neutralized with an acid to form an emulsion. The two emulsions are blended together to form an electrocoating composition that is stable, cures at 120°-135° C. to form smooth films that have good corrosion resistance and chip resistance.

Preferably, the electrocoating composition contains about 30-70% by weight, based on the weight of the binder of the electrocoating composition, of the first emulsion and about 70-30% by weight, based on the weight of the electrocoating composition, of the second emulsion.

The epoxy or polyepoxide resins used in this invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxy-3-tertiarybutylphenyl)-propane, 1,1-bis-(4-hydroxyphenyl)ethane, 2-methyl-1,1-bis-(4-hydroxyphenyl) propane, 2,2-bis-(4-hydroxy-3-tertiarybutylphenyl)propane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-cyclohexanediol, 1,4-cyclohexanediol, 1,2-bis(hydroxymethyl)cyclohexane, 1,3-bis-(hydroxymethyl)cyclohexane and hydrogenated bisphenol A.

The polyepoxides have weight average molecular weights of at least 200 and preferably within the range of 200 to 2000, and more preferably about 340 to 2000.

Molecular weights are determined by gel permeation chromatography using polystyrene as standard.

Preferably, the polyepoxide is chain extended to provide flexibility to the composition being electrodeposited. The chain extended polyepoxide enhances flow and coalescence and increases rupture voltage of the composition. Conventionally, the polyepoxide is chain extended with a polyether diol or a polyester diol.

The chain extended polyepoxide is then reacted with an amine to form an adduct that contains nitrogen. The amines used to form this adduct are monoamines, particularly secondary amines with primary hydroxyl groups. When a secondary amine containing a primary hydroxyl group is reacted with the terminal epoxide group of the chain extended polyepoxide, the result is the amine epoxy adduct in which the amine has become tertiary and contains a primary hydroxyl group. Typical amines that can be used are methyl ethanol amine, diethanolamine, and the like. The preferred amine is methyl ethanol amine.

Mixtures of the various amines described above can be used. The reaction of the secondary amine with the polyepoxide resin takes place upon mixing the amine with the product. The reaction can be conducted neat, or, optionally in the presence of suitable solvent. The reaction may be exothermic and cooling may be desired. However, heating to a moderate temperature, that is, within the range of 50° to 150° C., may be used to hasten the reaction.

The adduct of the chain extended polyepoxide and the amine attains its cationic character, i.e., cationic groups are formed, by at least partial neutralization with an acid. Examples of suitable acids include organic and inorganic acids such as formic acid, acetic acid, lactic acid, and phosphoric acid. The extent of neutralization will depend upon the particular product involved. It is only necessary that sufficient acid be used to disperse the adduct in water. Typically, the amount of acid used will be sufficient to provide at least 30 percent of the total theoretical neutralization. Excess acid beyond that required for 100 percent total theoretical neutralization can also be used.

The acrylic amine resin used herein is the polymerization product of ethylenically unsaturated monomers of alkyl(meth)acrylates, hydroxy containing alkyl(meth)acrylates, and amino containing alkyl(meth)acrylates and may contain up to 50% by weight of stryene and the resin has a weight average molecular weight of about 1,000-20,000. The molecular weight is determined as described above.

Typically useful alkyl(meth)acrylates have 1-12 carbon atoms in the alkyl group and are for example methyl methacrylate, ethyl methacrylate, propyl methacrylate, butyl methacrylate, isobutyl methacrylate, pentyl methacrylate, hexyl methacrylate, ethyl hexyl methacrylate, nonyl methacrylate, lauryl methacrylate and the like methyl acrylate, ethyl acrylate, propyl acrylate, butyl acrylate, isobutyl acrylate, pentyl acrylate, hexyl acrylate, ethyl hexyl acrylate, nonyl acrylate, lauryl acrylate and the like.

Typically useful hydroxy alkyl(meth)acylates have 2-4 carbon atoms in the alkyl group and are for example hydroxy ethyl acrylate, hydroxy ethyl methacrylate, hydroxy propyl acylate, hydroxy propyl methacrylate, hydroxy butyl acrylate, hydroxy butyl methacrylate, 2,3 dihydroxy propyl methacrylate and the like. Hydroxy alkyl(meth) acrylamide can also be used such as N-hydroxyethyl acrylamide and N-hydroxyethyl methacrylamide.

Typically useful amino alkyl(meth)acrylates are N-dialkyl- and N-monoalkyl aminoalkyl(meth)acrylates such as dimethylaminoethyl methacrylate, dimethylaminoethyl acrylate, N-tertbutyl aminoethyl acrylate, N-tertbutyl aminoethyl methacrylate and the like. Also, useful are N-dialkyl and N-monoalkyl aminoalkyl(-meth)acrylamides such as N-dimethylaminoethanol acrylamide or methacrylamide.

One useful acrylic amine resin contains about 30-50% by weight styrene, 20-30% by weight butyl acrylate, 10-30% by weight hydroxyethyl acrylate and 10-20% by weight dimethyl aminoethyl methacrylate.

The acrylic amine resin is prepared by a conventional solution polymerization process in which monomers, solvent and polymerization initiator are heated to a temperature of about 50°-180° C. for about 30 minutes to 10 hours. Typically, about 0.1-5.0 % by weight, based on the weight of the monomers, of an azo and/or peroxide polymerization initiator is used. Useful initiators are peroxides such as benzoyl peroxide or di-tert.-butyl peroxide, hydroperoxides such as tert.-butyl hydroperoxide or cumene hydroperoxide, or perester such as tert.butyl peroctoate or tert.-butyl perbenzoate, azo compounds such azo bis isobutyronitrile, 2,2'-azo-bis-(2-cyano propane) and 1,1'-azo-bis-cylohexane carbonitrile.

The extent of cationic group formation of the epoxy amine adduct or acrylic amine resin should be selected such that when the resin is mixed with aqueous medium, a stable dispersion will form. A stable dispersion is one which does not settle or is one which is easily redispersible if some sedimentation occurs. In addition, the dispersion should contain sufficient cationic groups that the dispersed resin particles will migrate towards the cathode in an electrocoating process when there is an electrical potential between the anode and cathode immersed in the aqueous dispersion or electrocoating bath.

In general, most of the cationic epoxy amine adducts and acrylic amine resins used in this invention contain from about 40 to 80, preferably from about 50 to 70 milliequivalents of a cationic group per hundred grams of solids.

The epoxy amine adduct should preferably have a weight average molecular weight, as determined by gel permeation chromatography using a polystyrene standard, of about 500-10,000, more preferably less than 5,000 and most preferably less than 3,000 in order to achieve a high level of flow after application.

The above described epoxy amine adduct and acrylic amine resin are each mixed with a crosslinking agent which is well known in the art. Typically useful crosslinkers are aliphatic and aromatic isocyanates such as hexamethylene diisocyanate, toluene diisocyanate, methylene diphenyl diisocyanate and the like. These isocyanates can also be reacted with a polyol such as trimethylolpropane to form a polyisocyanate. The isocyanate is then pre-reacted with a blocking agent such as methyl ethyl ketoxime or ethylene glycol mono butyl ether to block the isocyanate functionality (i.e., the crosslinking functionality). Upon heating the blocking agent separates and crosslinking occurs with the above described adduct and acrylic amine resin.

Preferably, an aromatic diisocyanate blocked with an alcohol is blended with the epoxy amine adduct. One preferred blocked aromatic diisocyanate is methylene diphenyl diisocyanate (crude MDI) blocked with a mixture of alcohols of methanol, ethanol and diethylene glycol monobutyl ether.

Preferably, an aromatic diisocyanate blocked with a ketoxime is blended with the acrylic amine resin. One preferred blocked aromatic diisocyanate is methylene diphenyl diisocyanate (crude MDI) blocked with methyl ethyl ketoxime.

The preferred amount of blocked isocyanate crosslinker that is blended with the epoxy amine adduct and the acrylic amine resin is about 20-50% by weight based on the weight of the adduct or resin and the blocked isocyanate crosslinker.

The above described epoxy amine adduct acrylic amine resin and the blocked isocyanate are the principal film forming resin ingredients in the electrocoating composition and are usually present in amounts of about 70 to 90 percent by weight of solids.

Besides the resin ingredients described above, the electrocoating compositions usually contain pigment which is incorporated into the composition in the form of a paste. The pigment paste is prepared by grinding or dispersing a pigment into a grinding vehicle and optional ingredients such as wetting agents, surfactants and defoamers. Pigment grinding vehicles are well known in the art. After grinding, the particle size of the pigment should be as small as practical; generally, the particle size is about 6-8 using a Hegman grinding gauge.

Pigments which can be used in the practice of this invention include titanium dioxide, basic lead silicate, strontium chromate, carbon black, iron oxide, clay and the like. Pigments with high surface areas and oil absorbencies should be used judiciously because they can have an undesirable effect on coalescence and flow.

The pigment-to-resin weight ratio is also important and should be preferably less than 0.5:1, more preferably less than 0.4:1, and usually about 0.2 to 0.4:1. Higher pigment-to-resin solids weight ratios also have been found to adversely affect coalescence and flow.

The coating compositions of the invention can contain optional ingredients such as wetting agents, surfactants, defoamers and the like. Examples of surfactants and wetting agents include alkyl imidazolines such as those available from Ciba-Geigy Industrial Chemicals as "Amine C," These optional ingredients, when present, constitute from about 0.1 to 20 percent by weight of resin solids. Plasticizers are optional ingredients because they promote flow. Examples are high boiling water immiscible materials such as ethylene or propylene oxide adducts of nonyl phenols or bisphenol A. Plasticizers are usually used in amounts of about 0.1 to 15 percent by weight resin solids.

Curing catalysts such as tin catalysts are usually present in the composition. Examples are dibutyl tin dilaurate and dibutyl tin oxide. When used, they are typically present in amounts of about 0.05 to 1 percent by weight of tin, based on weight of total resin solids.

The electrocoating composition of this invention is a dispersion of film forming resin ingredients such as the epoxy amine adduct, acrylic amine resin and the blocked isocyanate crosslinking agent in aqueous medium. The term "dispersion" as used herein is believed to be a two-phase translucent or opaque aqueous resinous system in which the resin is in the dispersed phase and an aqueous medium is the continuous phase. The average particle size diameter of the resin phase is about 0.1 to 10 microns preferably less than 5 microns. The concentration of the film forming resin ingredients in the aqueous medium is, in general, not critical. The aqueous dispersion usually contains from about 3 to 50 percent, typically, 5 to 40 percent by weight resin solids. Fully diluted electrocoating baths of an electrodeposition process generally have solids contents of about 3 to 25 percent by weight.

The major portion of the aqueous medium is water. Besides water, the aqueous medium may also contain coalescing solvent which may be necessary. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol.

The following examples illustrate the invention. All parts and percentages are on a weight basis unless otherwise noted. Molecular weights are determined by gel permeation chromatography using polystyrene as the standard.

EXAMPLE I

Preparation of Epoxy Amine Adduct

The following ingredients were charged into a suitable reaction vessel equipped with a stirrer and a heating source: 1478 parts Epon 828 ® (epoxy resin of diglycidyl ether of Bisphenol A from Shell Chemical Company having an epoxy equivalent weight of 188); 533 parts ethoxylated Bisphenol A having a hydroxy equivalent weight of 247 (Synfac 8009 ® from Milliken Company); 427 parts of Bisphenol A; and 121 parts xylene. The resulting reaction mixture was heated to 160° C. under a nitrogen blanket and held at this temperature for 1 hour. 5.1 parts dimethyl benzyl amine were added and the mixture was held at 147° C. until a 1150 epoxy equivalent weight was obtained. The reaction mixture was cooled to 98° C. and 168 parts of diketimine reaction product of dithylenetriamine and methyl isobutyl ketone at 72.7% solids) and 143 parts of methyl ethanol amine were added. The resulting mixture was held at 120° C. for 1 hour and then 727 parts of methyl isobutyl ketone were added. The resulting resin solution had a non-volatile content of 75%.

Preparation of Acrvlic Amine Resin

The following constituents were charged into a reaction vessel equipped as above:

|  | Parts by Weight |
| --- | --- |
| Portion 1 | |
| Styrene monomer | 500.0 |
| Butyl acrylate monomer | 500.0 |
| Hydroxy ethyl acrylate monomer | 400.0 |
| Dimethylamino ethyl methacrylate monomer | 300.0 |
| VAZO 64 catalyst (azo type catalyst) | 60.0 |
| Methyl isobutyl ketone | 75.0 |
| Portion 2 | |
| VAZO 64 | 4.0 |
| Isobutyl ketone | 99.0 |
| Total | 1938.0 |

Portion 1 was charged into the reaction vessel and were heated over a 2 hour period to the reflux temperature of the resulting reaction mixture. After holding the reaction mixture at its reflux temperature for an additional 15 minutes, Portion 2 was added and the reaction mixture was maintained at its reflux temperature for additional 60 minutes and then cooled to room temperature.

The resulting polymer solution has a solids content of 70% and the acrylic polymer contains 40% styrene, 25% butyl acrylate, 20% hydroxy ethyl acrylate and 15% dimethyamino ethyl methacrylate.

Preparation of Alcohol Blocked Isocyanate Crosslinker

An alcohol blocked polyisocyanate crosslinking resin solution was prepared by charging 1840 parts of Isonate 181 ® (diol modified methylene diphenyl diisocyanate from Dow Chemical Company) and 786.3 parts of methyl isobutyl ketone into a reaction vessel equipped as above and heated to 37 C under a dry nitrogen blanket and 0.3 parts of dibutyl tin dilaurate were added. A mixture of 1093 parts of methanol, 156.2 parts ethanol and 515.5 parts of diethylene glycol monobutyl ether was slowly charged into the reaction vessel while maintaining the reaction temperature below 93° C. The resulting reaction mixture was held at 93° C. for an additional hour until essentially all of the isocyanate was consumed as indicated by infrared scan of the reaction mixture. 87.4 parts of butanol was added. The resulting resin solution had a nonvolatile content of 75%.

Preparation of Ketoxime Blocked Isocyanate Crosslinker

A ketoxime blocked polyisocyanate crosslinking resin solution was prepared by charging 1320.0 parts of crude MDI (methylene diphenyl diisocyanate from Dow Chemical Company) and 939.0 parts of methyl isobutyl ketone into a reaction vessel equipped as above under a dry nitrogen blanket. 879 parts of methyl ethyl ketoxime were slowly charged into the reaction vessel while maintaining the reaction temperature below 93° C. The reaction mixture was held at 93° C. for an additional hour until essentially all of the isocyanate was consumed as indicated by infrared scan of the reaction mixture. The resulting resin solution had a nonvolatile content of 70%.

Preparation of Flexibilizinq Additive Emulsion

A flexibilizing additive emulsion was prepared by charging 2322 parts of Jeffamine D-2000 (a polyoxypropylene-diamine having a molecular weight of to a reaction vessel un a nitrogen atmosphere and heat to 90° C. 859 parts of Epon 1000 ® (polyglycidyl ether of Bisphenol A having an epoxy equivalent weight of 500) dissolved in 345 parts of 2-butoxyethanol were added. An emulsion was formed by adding 68 parts of acetic acid and 5354 parts of deionized water.

Preparation of Quaternizing Agent

The following constituents were charged into a reaction vessel equipped as above:

|  | Parts by Weight | NV* |
| --- | --- | --- |
| 2-Ethylhexanol half capped TDI in methyl isobutyl ketone | 320.0 | 304.0 |
| Dimethylethanolamine | 87.2 | 87.2 |
| Aqueous Lactic Acid Solution | 117.6 | 88.2 |
| 2-Butoxyethanol | 39.2 | |
| Total | 564.0 | 479.4 |

*NV-Non-volatile content

The quaternizing agent was prepared by adding dimethylethanolamine to the ethylhexanol half-capped TDI in the reaction vessel at room temperature. An exothermic reaction occured and the reaction mixture was stirred for one hour at 80° C. The aqueous lactic acid solution was then added and then followed by the addition of 2-butoxyethanol. The reaction mixture was held for about one hour at 65° C. with constant stirring to form the quaternizing agent.

Preparation of the Pigment Grinding Vehicle

|  | Parts by Weight | NV |
| --- | --- | --- |
| Epon 829 ® | 710.0 | 682.0 |
| Bisphenol A | 289.6 | 289.6 |
| 2-Ethylhexanol half capped TDI in methyl isobutyl ketone | 406.0 | 386.1 |
| Quaternizing Agent (prepared above) | 496.3 | 421.9 |
| Deionized Water | 71.2 | |
| 2-Butoxyethanol | 1095.2 | |
| Total | 3068.3 | 1779.6 |

To form the pigment grinding vehicle, Epon 829 ® (a diglycidyl ether of bisphenol A having an expoxide equivalent weight of 193-203 from Shell Chemical Co.) and Bisphenol A were charged under a nitrogen atmosphere to a reaction vessel equipped as above and heated to 150°-160° C. to initiate an exothermic reaction. The exothermic reaction was continued for about 1 hour at 150°-160° C. The reaction mixture was then cooled to 120° C. and the 2-ethylhexanol half-capped TDI (toluene diisocyanate) was added. The temperature of the reaction mixture was held at 110°-120° C. for one hour, followed by the addition of the 2-butoxyethanol. The reaction mixture was then cooled to 85°-90°

C., homogenized and then water was added followed by the addition of the quaternizing agent (prepared above). The temperature of the reaction mixture was held at 80°-85° C. until an acid value of about 1 was obtained. The reaction mixture had a solids content of 58 percent.

Preparation of Emulsion I

An attempt was made at preparing a stable emulsion by mixing the epoxy amine adduct, acrylic amine resin and the alcohol blocked and oxide blocked isocyanate solutions with surfactant water and acid. The resulting emulsion wa not stable after 2 days.

The emulsion was prepared as follows:

|  | Parts by Weight | NV |
| --- | --- | --- |
| Epoxy amine adduct (prepared above) | 2800 | 2100 |
| Acrylic amine resin (prepared above) | 3000 | 2100 |
| Alcohol blocked isocyanate (prepared above) | 1867 | 1400 |
| ketoxime blocked isocyanate (prepared above) | 2000 | 1400 |
| Surfactant[1] | 70 | |
| Deionized water | 9477 | |
| Lactic acid | 230 | |
| Total | 19444 | |

[1]Surfactant is a mixture of 120 parts "Amine C" from Ciba-Geigy, 120 parts acetylenic alcohol, commercially available as "Surfynol 104", 120 parts of 2-butyoxy ethanol and 221 parts by weight of deionized water and 19 parts glacial acetic acid.

The epoxy amine adduct, acrylic amine resin and blocked isocyanates, acid and surfactant were mixed together and deionized water was added under agitation. The resulting emulsion had a solids content of about 36%. The emulsion was stable for only two days before precipitation occured.

Preparation of Pigment Paste

|  | Parts by Weight |
| --- | --- |
| Pigment Grinding Vehicle (prepared above) | 266.62 |
| Deionized Water | 455.30 |
| Carbon Black Pigment | 25.98 |
| Aluminum Silicate Pigment | 51.85 |
| Lead Silicate Pigment | 22.24 |
| Dibutyl Tin Oxide | 16.34 |
| Titanium Dioxide Pigment | 296.23 |
| Total | 1134.56 |

The above ingredients were mixed together and ground in a sand mill to a Hegman No. 7 fineness.

Preparation of Emulsion of Epoxy Amine Adduct and Blocked Isocyanate

The following constituents were blended together:

|  | Parts by Weight |
| --- | --- |
| Epoxy amine adduct (prepared above) | 4000.0 |
| Alcohol blocked isocyanate (prepared above) | 2667.0 |
| Surfactant[1] (described above) | 50.0 |
| Deionized Water | 6990.0 |
| Lactic acid | 182.0 |
| Total | 13889.0 |

The epoxy amine adduct was thoroughly mixed with the blocked isocyanate, lactic acid and surfactant and then deionized water water was added under agitation. The resulting dispersion had a solid content of about 36%.

Preparation of Emulsion of Acrylic Amine Resin and Blocked Isocyanate

The following constituents were blended together:

|  | Parts by Weight |
| --- | --- |
| Acrylic amine resin (prepared above) | 4286.0 |
| Ketoxime blocked isocyanate (prepared above) | 2857.0 |
| Surfactant[1] (described above) | 50.0 |
| Deionized Water | 6549.0 |
| Lactic acid | 147.0 |
| Total | 13889.0 |

The acrylic amine resin was thoroughly mixed with the blocked isocyanate, lactic acid and surfactant and then deionized water water was added under agitation. The resulting dispersion had a solids content of about 36%.

Preparation of Electrocoating Baths A and B

|  | Parts by Weight | |
| --- | --- | --- |
|  | Bath A | Bath B |
| Emulsion I (prepared above) | 1166 | — |
| Emulsion of epoxy amine adduct and blocked isocyanate (prepared above) | — | 583 |
| Emulsion of acrylic amine resin and blocked isocyanate (prepared above) | — | 583 |
| Pigment paste (prepared above) | 312 | 312 |
| Deionized water | 1454 | 1454 |
| Flexibilizing additive emulsion (prepared above) | 68 | 68 |
| Total | 3000 | 3000 |

The two electrocoating baths A and B were prepared by blending the above ingredients. The resulting electrocating bath A has a pH of 6.3. The resulting electrocating bath B has a pH of 6.4.

Zinc phosphate coated cold roll steel panels were cathodically electrocoated in each electrocoating bath at a bath temperature of about 28° C. for 2 minutes. For the panel coated in bath A the film build is about 1.4 mils at 100 volts and the appearance is rough. The rupture voltage is 120 volts. Because of unstable bath and rough film, no further test was done on the panel.

For the panel coated in bath B, the film build is about 0.7 mil at 160 volts and the appearance is smooth. It passed ninety methyl isobutyl ketone double rubs. The electrodeposited panel was scribed and subjected to the 20 cycle GM scab corrossion test.

One cycle consisted of a 24 hour period in which the coating was soaked in an ambient temperature 5% salt solution, dried and placed in 60° C./85% relative humidity cabinet. A hot/cold cycle was incorporated into cycles 1, 6, 11, and 16 by which the panel was heated to 60° C. and then cooled to −9° C. After the 20 cycle scab test the panels were blown off with compressed air and were scraped to remove any loose coating. The scribe creep is 5 mm which is acceptable.

We claim:

1. An aqueous cationic electrocating composition comprising an epoxy amine adduct which is the reaction product of a polyepoxide resin and an amine and having a weight average molecular weight of about 500-10,000, an acrylic amine resin which contains amine groups having a weight average molecular weight of about 1,000-20,000 and a blocked polyisocyanate crosslinking agent;

wherein the composition is prepared by blending a first emulsion of the epoxy amid adduct nd the blocked polyisocyanate crosslinking agent with a second emulsion of the acrylic amine resin and blocked polyisocyanate crosslinking agent; where the first and second emulsion are each individually formed by blending the adduct or resin with the blocked polyisocyanate crosslinking agent and then adding an organic acid to form a salt which forms a stable aqueous emulsion; and wherein the molecular weights are determined by gel permeation chromatography using polystyrene as the standard, 2. The electrocating composition of claim 1 wherein said polyepoxide is a polyglycidyl ether of polyhydric phenol.

3. The electrocating composition of claim 1 wherein the acrylic amine resin comprises the polymerization product of alky(meth)acrylate having 1-12 carbon atoms in the alkyl group, hydroxy alkyl (meth)acrylate having 2-4 carbon atoms in the alkyl group and an amino containing alkyl(meth)acrylate.

4. The the electrocoating composition of claim 3 in which the acrylic amine resin contains up to 50% by weight styrene.

5. The electrocoating composition of claim 4 in which the acrylic amine resin consists essentially polymerized monomers of about 30-50% by weight styrene, 20-30% by weight butyl acrylate, 10-30% by weight hydroxyethyl acrylate and 10-20% by weight dimethyl amino ethyl methacrylate.

6. The electrocoating composition of claim 1 in which the epoxy amine adduct and the acrylic amine resin are formed with a monoamine or a secondary amine having primary hydroxyl groups.

7. The electrocoating composition of claim 1 in which the blocked polyisocyanate is an aromatic or aliphatic polyisocyanate blocked with a ketoxime or an alcohol.

8. The electrocoating composition of claim 7 in which the polyisocyanate that is blended with the epoxy amine adduct is an aromatic diisocyanate blocked with an alcohol.

9. The electrocoating composition of claim 8 in which the aromatic diisocyanate is methylene diphenyl diisocyanate.

10. The electrocoating composition of claim 9 in which the alcohol is a mixture of methanol, ethanol and diethylene glycol monobutyl ether.

11. The electrocoating composition of claim 7 in which the polyisocyanate that is blended with the acrylic amine resin is an aromatic diisocyanate blocked with a ketoxime.

12. The electrocoating composition of claim 11 in which the aromatic diisocyanate is methylene diphenyl diisocyanate.

13. The electrocoating composition of claim 12 in which the ketone is methyl ethyl ketoxime.

14. A method of coating an electrically conductive article with the electrocoating composition of claim 1, comprising the following steps:
  (1) forming an epoxy amine adduct and mixing said adduct with a blocked polyisocyanate and adding acid and water to form an emulsion;
  (2) forming an acrylic amine resin and mixing said resin with a blocked polyisocyanate and adding acid and water to form an emulsion;
  (3) blending emulsions formed in steps (1) and (2) together to form a principal emulsion;
  (4) adding more water and pigment paste to the principal emulsion thereby forming an electrocoat bath;
  (5) immersing the article in the electrocoat bath; and
  (6) passing a direct current through the article and depositing a coating on the article.

* * * * *